(12) United States Patent
Ikeda et al.

(10) Patent No.: US 11,183,069 B2
(45) Date of Patent: Nov. 23, 2021

(54) DISPLAY CONTROL DEVICE, DISPLAY CONTROL METHOD, AND STORAGE MEDIUM

(71) Applicant: HONDA MOTOR CO., LTD., Tokyo (JP)

(72) Inventors: Masaya Ikeda, Wako (JP); Yasuharu Hashimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/817,668

(22) Filed: Mar. 13, 2020

(65) Prior Publication Data

US 2020/0312151 A1 Oct. 1, 2020

(30) Foreign Application Priority Data

Mar. 28, 2019 (JP) .............................. JP2019-063989

(51) Int. Cl.
 *G08G 1/16* (2006.01)
(52) U.S. Cl.
 CPC .................................. *G08G 1/167* (2013.01)
(58) Field of Classification Search
 CPC ..................................................... G08G 1/167
 See application file for complete search history.

(56) References Cited

U.S. PATENT DOCUMENTS

2019/0047561 A1* 2/2019 Nishiguchi ........... B60W 30/12

FOREIGN PATENT DOCUMENTS

| JP | 2009-274594 | 11/2009 |
|---|---|---|
| JP | 2016-199204 | 12/2016 |
| WO | 2018/211591 | 11/2018 |

OTHER PUBLICATIONS

Japanese Notice of Allowance for Japanese Application No. 2019-063989 dated Jan. 5, 2021.

* cited by examiner

*Primary Examiner* — Michael D Lang
(74) *Attorney, Agent, or Firm* — Amin, Turocy & Watson, LLP

(57) ABSTRACT

A display control device includes a display that is configured to display information and a display controller that is configured to cause the display to display a plurality of partition lines for partitioning a host lane in which a vehicle is present and an adjacent lane adjacent to the host lane, and the display controller is configured to cause the display to display a partition line of the adjacent lane in a case where the adjacent lane is a lane in which a lane change from the host lane is possible, and restrict causing the display to display the partition line of the adjacent lane in a case where the adjacent lane is not a lane in which a lane change from the host lane is possible.

9 Claims, 16 Drawing Sheets

DISPLAY CONTROL DEVICE, DISPLAY CONTROL METHOD, AND STORAGE MEDIUM

CROSS-REFERENCE TO RELATED APPLICATION

This application is based upon and claims the benefit of priority from Japanese Patent Application No. 2019-063989, filed Mar. 28, 2019, the entire content of which is incorporated herein by reference.

BACKGROUND

Field of the Invention

The present invention relates to a display control device, a display control method, and a storage medium.

Description of Related Art

A technique for controlling traveling of a host vehicle so that the host vehicle performs a lane change from a traveling lane in which the host vehicle travels to an adjacent lane adjacent to the traveling lane, and causing a display to display the progress situation of a lane change to a driver of the host vehicle is known (see, for example, Japanese Unexamined Patent Application, First Publication No. 2016-199204). In such a technique, the display is caused to display a lane boundary line for partitioning a traveling lane and an adjacent lane while changing the position of the lane boundary line in accordance with the progress situation of a lane change.

SUMMARY

However, in the related art, even when a display was caused to display partition lines of a host lane and an adjacent lane, it was not possible to allow an occupant to understand whether the adjacent lane was a lane in which a lane change is possible in some cases.

An aspect of the present invention is to provide a display control device, a display control method, and a storage medium that make it possible to allow an occupant to correctly understand whether or not to change a lane to an adjacent lane.

A display control device, a display control method, and a storage medium according to the present invention have the following configurations adopted therein.

(1) According to an aspect of the present invention, there is provided a display control device including: a display that is configured to display information; and a display controller that is configured to cause the display to display a plurality of partition lines for partitioning a host lane in which a vehicle is present and an adjacent lane adjacent to the host lane, wherein the display controller is configured to cause the display to display a partition line of the adjacent lane in a case where the adjacent lane is a lane in which a lane change from the host lane is possible, and restrict causing the display to display the partition line of the adjacent lane in a case where the adjacent lane is not a lane in which a lane change from the host lane is possible.

(2) In the aspect of the above (1), the display controller is configured to restrict causing the display to display the partition line of the adjacent lane in a case where a color of the partition line of the adjacent lane is a first color indicating prohibition of the lane change.

(3) In the aspect of the above (2), the display controller is configured to cause the display to display the partition line of the adjacent lane without restriction in a case where the color of the partition line of the adjacent lane is changed from the first color to a second color indicating permission of the lane change.

(4) In any one aspect of the above (1) to (3), the display controller is configured to restrict causing the display to display the partition line of the adjacent lane in a case where the adjacent lane is a lane deviating from a route to a destination of the vehicle.

(5) In any one aspect of the above (1) to (4), the display controller is configured to restrict causing the display to display the partition line of the adjacent lane in a case where the host lane and the adjacent lane are adjacent to each other with a specific region in which passing is not recommended or is prohibited interposed therebetween.

(6) In any one aspect of the above (1) to (5), the display controller is configured to further restrict causing the display to display the adjacent lane and the partition line for partitioning the adjacent lane in a case where the adjacent lane is not a lane in which a lane change from the host lane is possible.

(7) According to another aspect of the present invention, there is provided a display control method including causing a computer mounted in a vehicle including a display that is configured to display information to: cause the display to display a plurality of partition lines for partitioning a host lane in which the vehicle is present and an adjacent lane adjacent to the host lane; cause the display to display a partition line of the adjacent lane in a case where the adjacent lane is a lane in which a lane change from the host lane is possible; and restrict causing the display to display the partition line of the adjacent lane in a case where the adjacent lane is not a lane in which a lane change from the host lane is possible.

(8) According to another aspect of the present invention, there is provided a computer readable non-transitory storage medium having a program stored therein, the program causing a computer mounted in a vehicle including a display that is configured to display information to execute: causing the display to display a plurality of partition lines for partitioning a host lane in which the vehicle is present and an adjacent lane adjacent to the host lane; causing the display to display a partition line of the adjacent lane in a case where the adjacent lane is a lane in which a lane change from the host lane is possible; and restricting causing the display to display the partition line of the adjacent lane in a case where the adjacent lane is not a lane in which a lane change from the host lane is possible.

According to any aspect of (1) to (8), it is possible to allow an occupant to correctly understand whether or not to change a lane to an adjacent lane.

DESCRIPTION OF EMBODIMENTS

Hereinafter, an embodiment of a display control device, a display control method, and a storage medium of the present invention will be described with reference to the accompanying drawings. In the embodiment, an example in which a recognition result of the periphery of a vehicle is displayed on a display device when driving assistance of the vehicle is performed will be described. The driving assistance involves, for example, controlling at least one of the steering and speed of a vehicle such as an adaptive cruise control system (ACC) or a lane keeping assistance system (LKAS), or controlling both of them. Particularly, controlling the steering and speed of a vehicle is also called automated driving. A case where rules of left-hand traffic are applied will be described below, but in a case where rules of right-hand traffic are applied, the right and left may be interchanged.

Overall Configuration

Figure 1:
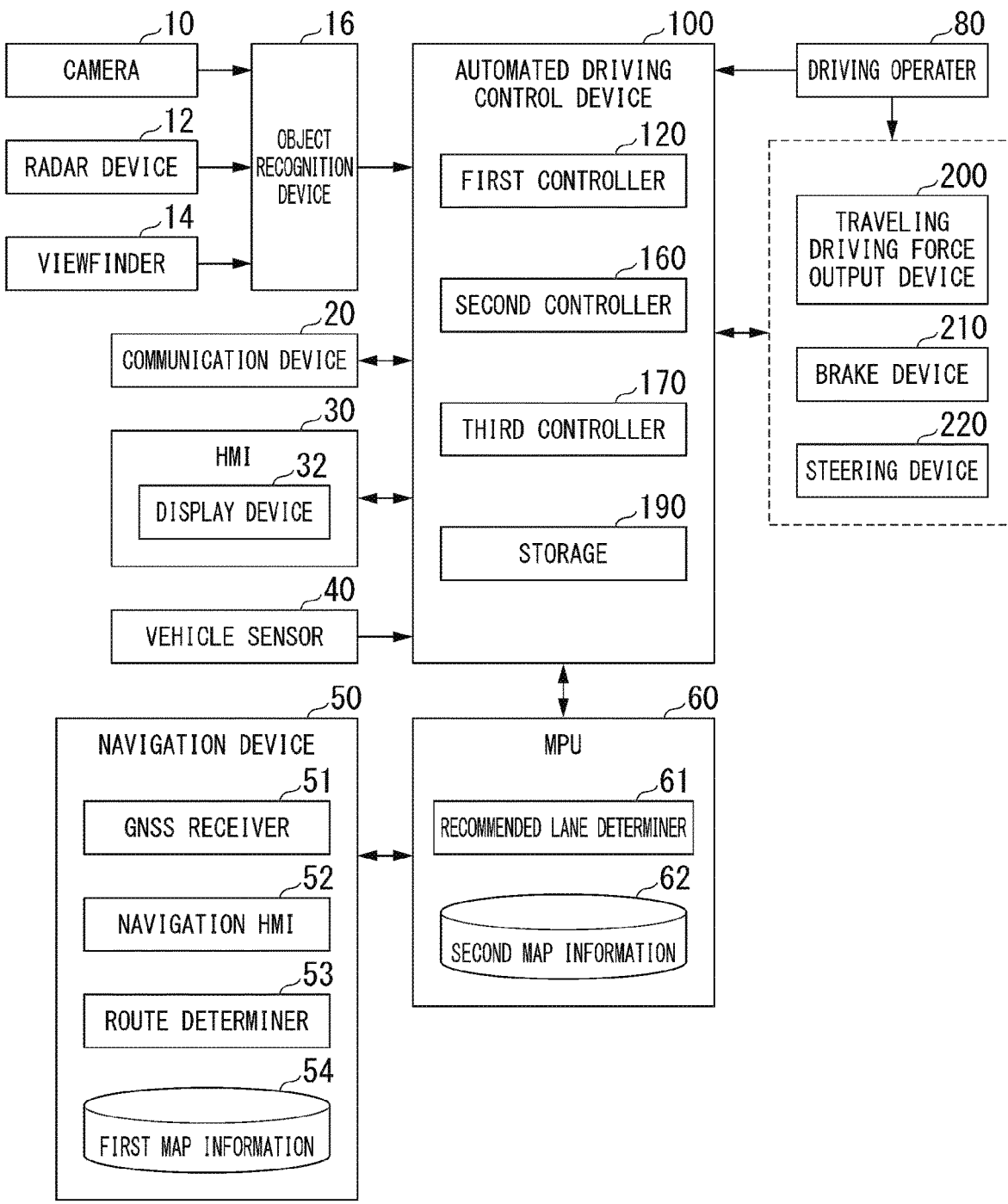
FIG. 1 is a configuration diagram of a vehicle system using a display control device according to an embodiment.

FIG. 1 is a configuration diagram of a vehicle system 1 using a display control device according to an embodiment. A vehicle in which the vehicle system 1 is mounted (hereinafter referred to as a host vehicle M) is, for example, a two-wheeled, three-wheeled, or four-wheeled vehicle or the like. The driving sources of such vehicles include an internal-combustion engine such as a diesel engine or a gasoline engine, an electric motor, or a combination thereof. The electric motor operates using power generated by a generator connected to an internal-combustion engine or discharging power of a secondary battery or a fuel cell.

The vehicle system 1 includes, for example, a camera 10, a radar device 12, a viewfinder 14, an object recognition device 16, a communication device 20, a human machine interface (HMI) 30, a vehicle sensor 40, a navigation device 50, a map positioning unit (MPU) 60, a driving operator 80, an in-vehicle camera 90, an automated driving control device 100, a traveling driving force output device 200, a brake device 210, and a steering device 220. These devices or instruments are connected to each other through a multiplex communication line such as a controller area network (CAN) communication line, a serial communication line, a wireless communication network, or the like. The configuration shown in FIG. 1 is merely an example, and some portions of the configuration may be omitted, or other configurations may be further added.

The camera 10 is a digital camera using a solid-state imaging element such as, for example, a charge coupled device (CCD) or a complementary metal oxide semiconductor (CMOS). The camera 10 is installed at any point on the host vehicle M. In a case where a forward image is captured, the camera 10 is installed on the upper portion of the front windshield, the rear surface of the rear-view mirror, or the like. The camera 10, for example, repeatedly captures an image of the vicinity of the host vehicle M periodically. The camera 10 may be a stereo camera.

The radar device 12 radiates radio waves such as millimeter waves to the vicinity of the host vehicle M, and detects radio waves (reflected waves) reflected from an object to detect at least the position (distance to and orientation of) of the object. The radar device 12 is installed at any point of the host vehicle M. The radar device 12 may detect the position and speed of an object with a frequency modulated continuous wave (FM-CW) system.

The viewfinder 14 is a sensor using light detection and ranging (LIDAR). The viewfinder 14 irradiates the vicinity of the host vehicle M with light, and measures scattered light. The viewfinder 14 detects a distance to an object on the basis of a time from light emission to light reception. The irradiation light is, for example, pulsed laser light. The viewfinder 14 is installed at any point on the host vehicle M.

The object recognition device 16 recognizes the position, type, speed, or the like of an object by performing a sensor fusion process on the results of detection performed by some or all of the camera 10, the radar device 12, and the viewfinder 14. The object recognition device 16 outputs recognition result to the automated driving control device 100. The object recognition device 16 may output the detection results of the camera 10, the radar device 12, and the viewfinder 14, as they are, to the automated driving control device 100. The object recognition device 16 may be omitted from the vehicle system 1.

The communication device 20 communicates with another vehicle which is present in the periphery of the host vehicle M using, for example, a cellular network, a Wi-Fi network, Bluetooth (registered trademark, omitted hereinafter), dedicated short range communication (DSRC), or the like, or communicates with various server devices through a wireless base station.

The HMI 30 presents various types of information to an occupant of the host vehicle M, and accepts the occupant's input operation. For example, the HMI 30 includes a display device 32. The display device 32 includes a first display 32A and a second display 32B. The HMI 30 may further include a speaker, a buzzer, a touch panel, or the like. The display device 32 is an example of a "display."

Figure 2:
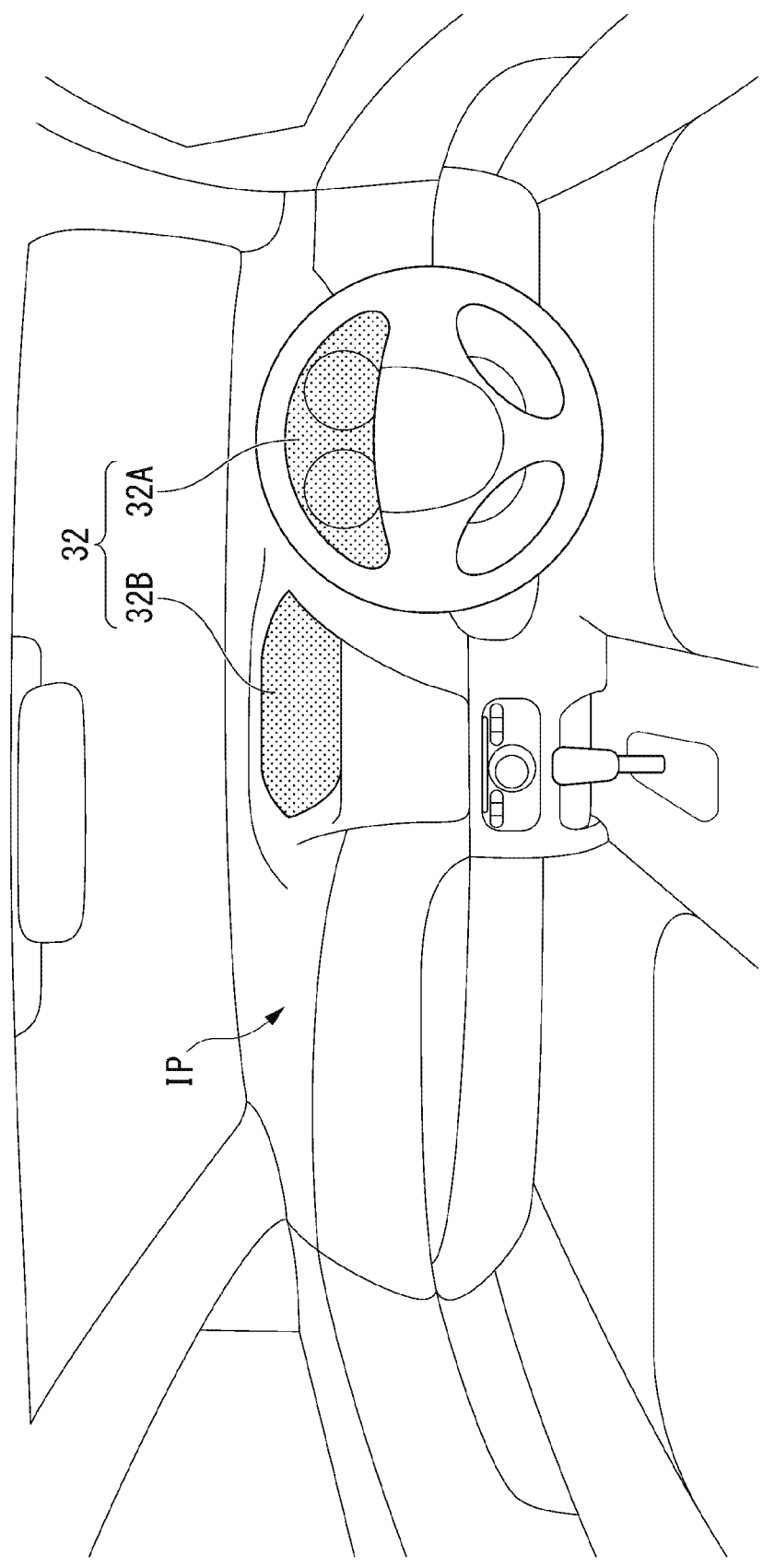
FIG. 2 is a diagram schematically showing an interior appearance of a host vehicle.

FIG. 2 is a diagram schematically showing an interior appearance of the host vehicle M. For example, the first display 32A is provided in the vicinity of the front of a driver's seat (a seat closest to a steering wheel) in an instrument panel IP, and is installed at a position that can be visually recognized by an occupant from a gap in a steering wheel or over the steering wheel. The first display 32A is, for example, a liquid crystal display (LCD), an organic electro luminescence (EL) display device, or the like. Information required for traveling of the host vehicle M during manual driving or during driving assistance is displayed on the first display 32A as an image. The information required for traveling of the host vehicle M during manual driving is, for example, the speed, engine speed, remaining amount of fuel, radiator water temperature, traveling distance, or other information of the host vehicle M. The information required for traveling of the host vehicle M during driving assistance is, for example, a future trajectory of the host vehicle M (a target trajectory to be described later), the presence or absence of lane change, a lane that is a lane change destination, or information on a recognized lane (partition line), another vehicle or the like. The information required for traveling of the host vehicle M during driving assistance may include some of all of the information required for traveling of the host vehicle M during manual driving.

The second display 32B is installed, for example, at the center of the instrument panel IP. The second display 32B is, for example, an LCD, an organic EL display device or the like similarly to the first display 32A. The second display 32B displays, for example, a navigation result of the navigation device 50 as an image. The second display 32B may display a television program, play a DVD, or display content such as a downloaded movie.

FIG. 1 will be described again. The vehicle sensor 40 includes a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory.

The GNSS receiver 51 specifies the position of the host vehicle M on the basis of a signal received from a GNSS satellite. The position of the host vehicle M may be specified or complemented by an inertial navigation system (INS) in which an output of the vehicle sensor 40 is used.

The navigation HMI 52 includes a display device, a speaker, a touch panel, a key, and the like. A portion or the entirety of the navigation HMI 52 may be shared with the above-described the HMI 30.

The route determiner 53 determines, for example, a route (hereinafter, a route on a map) from the position (or any input position) of the host vehicle M specified by the GNSS receiver 51 to a destination input by an occupant using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like. The route on a map is output to the MPU 60.

The navigation device 50 may perform route guidance using the navigation HMI 52 on the basis of the route on a map. The navigation device 50 may be realized by the function of a terminal device such as, for example, a smartphone or a tablet terminal possessed by an occupant. The navigation device 50 may transmit its current position and destination to a navigation server through the communication device 20, and acquire the same route as the route on a map from the navigation server.

The MPU 60 includes, for example, a recommended lane determiner 61, and holds second map information 62 in a storage device such as an HDD or a flash memory. The recommended lane determiner 61 divides the route on a map provided from the navigation device 50 into a plurality of blocks (for example, divides the route on a map every 100 [m] in a vehicle traveling direction), and determines a recommended lane for each block with reference to the second map information 62. The recommended lane determiner 61 makes a determination on which lane from the left to travel along. In a case where a branch point is present in the route on a map, the recommended lane determiner 61 determines a recommended lane so that the host vehicle M can travel along a rational route for advancing to a branch destination.

The second map information 62 is map information having a higher accuracy than that of the first map information 54. The second map information 62 includes, for example, information of the center of a lane, information of the boundary of a lane, information of the type of lane, information of the type of partition line for partitioning a lane, or the like. The second map information 62 may include road information, traffic regulations information, address information (address or zip code), facility information, telephone number information, or the like. The second map information 62 may be updated when necessary by the communication device 20 communicating with another device.

The driving operator 80 includes, for example, an accelerator pedal, a brake pedal, a shift lever, a steering wheel, a direction indicator, a joystick, and other operators. A sensor that detects the amount of operation or the presence or absence of operation is installed on the driving operator 80, and the detection results are output to the automated driving control device 100, or some or all of the traveling driving force output device 200, the brake device 210, and the steering device 220.

The automated driving control device 100 includes, for example, a first controller 120, the second controller 160, the third controller 170, and a storage 190. The first controller 120, the second controller 160, and the third controller 170 are realized by a processor such as, for example, a central processing unit (CPU) or a graphics processing unit (GPU) executing a program (software). Some or all of these components may be realized by hardware (circuit unit; including circuitry) such as a large scale integration (LSI), an application specific integrated circuit (ASIC), or a field-programmable gate array (FPGA), and may be realized by software and hardware in cooperation. The program may be stored in the storage 190 of the automated driving control device 100 in advance, may be stored in a detachable storage medium such as a DVD or a CD-ROM, or may be installed in the storage 190 by the storage medium being mounted in the drive device.

The storage 190 is realized by, for example, an HDD, a flash memory, an electrically erasable programmable read only memory (EEPROM), a read only memory (ROM), a random access memory (RAM), or the like. The storage 190 stores, for example, a program which is read out and executed by a processor.

Figure 3:
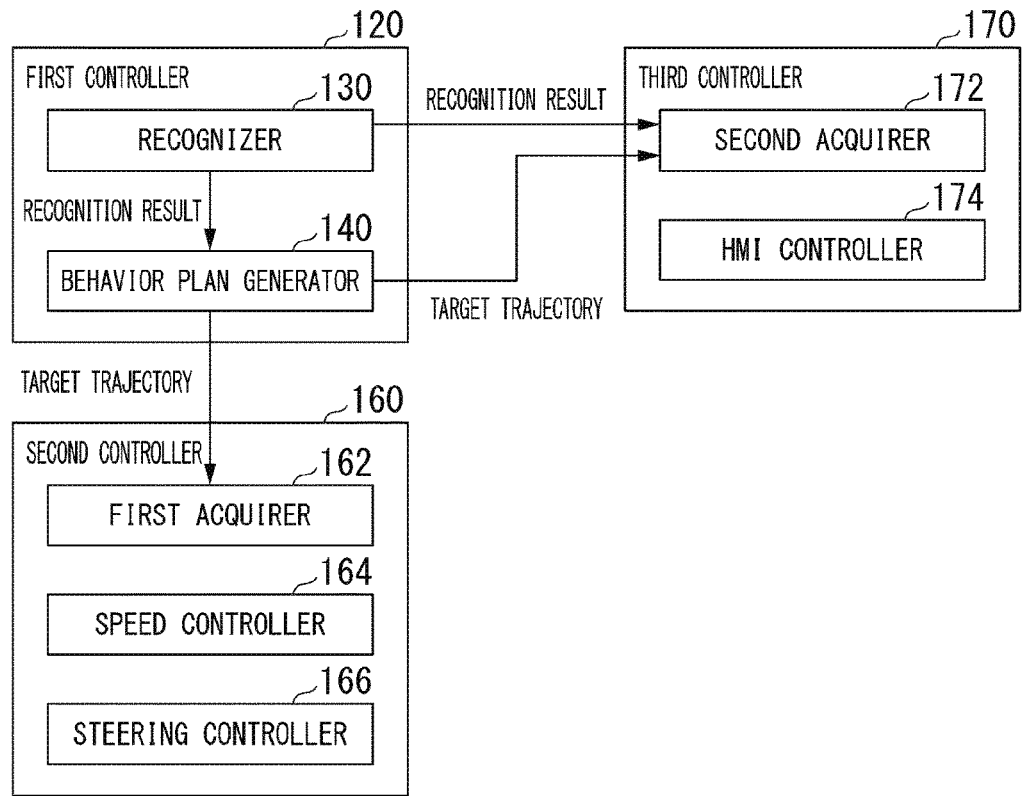
FIG. 3 is a functional configuration diagram of a first controller, a second controller, and a third controller.

FIG. 3 is a functional configuration diagram of the first controller 120, the second controller 160, and the third controller 170. The first controller 120 includes, for example, a recognizer 130 and a behavior plan generator 140. The first controller 120 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal or a road sign on which pattern matching is possible) imparted in advance being concurrently executed, and being comprehensively evaluated by performing scoring on both. Thereby, the reliability of automated driving is secured.

The recognizer 130 recognizes an object which is present in the periphery of the host vehicle M on the basis of information input directly from the camera 10, the radar device 12, and the viewfinder 14 or information input indirectly through the object recognition device 16. Examples of the object recognized by the recognizer 130 include, for, a bicycle, an autobike, a four-wheeled automobile, a pedestrian, a road mark, a road sign, a partition line, a telephone pole, a guardrail, a fallen object, and the like. The recognizer 130 recognizes the state of the position, speed, acceleration or the like of an object. The position of the object is recognized as, for example, a position in relative coordinates (that is, a relative position with respect to the host vehicle M) with a representative point (such as the centroid or the center of a drive shaft) of the vehicle M as an origin, and is used in control. The position of the object may be represented by a representative point such as the centroid or a corner of the object, or may be represented by a representative region. The "state" of the object may include the acceleration or jerk of the object, or a "behavior state" (for example, whether it is performing or attempting to perform a lane change).

The recognizer 130 recognizes a host lane in which the host vehicle M is traveling or an adjacent lane which is adjacent to the host lane on the basis of a recognized partition line. For example, the recognizer 130 recognizes the host lane or the adjacent lane by comparing a pattern of a road partition line (for example, an array of solid lines and broken lines) obtained from the second map information 62 with a pattern of a road partition line located in the vicinity of the host vehicle M which is recognized from an image of the camera 10.

The recognizer 130 is not limited to the road partition line, and may recognize the host lane and the adjacent lane by recognizing a driving boundary (road boundary) including a road partition line, a shoulder, a curbstone, a median strip, a guardrail, or the like. In this recognition, the position of the host vehicle M acquired from the navigation device 50 or processing results based on an INS may be added. The recognizer 130 may further recognize a stop line, an obstacle, a red light, a tollbooth, and other road events.

Upon recognizing a host lane, the recognizer 130 recognizes the relative position or posture of the host vehicle M with respect to the host lane. The recognizer 130 may recognize, for example, deviation of the host vehicle M from the center of the lane which is a reference point, and an angle formed with respect to a line aligned with the center of the lane of the host vehicle M in its traveling direction, as the relative position and posture of the host vehicle M with respect to the host lane. Instead, the recognizer 130 may recognize the position of the reference point of the host vehicle M or the like with respect to either lateral end portion (a road partition line or a road boundary) of the host lane, as the relative position of the host vehicle M with respect to the host lane.

The behavior plan generator 140 includes, for example, an event determiner 142 and a target trajectory generator 144. In a case where the host vehicle M is under automated driving in a route in which a recommended lane is determined, the event determiner 142 determines a traveling mode of the automated driving. In the following description, information in which a traveling mode of automated driving is specified is referred to as an event.

Examples of the event include a constant-speed traveling event, a following traveling event, a lane change event, a divergence event, a merging event, an overtaking event, and the like. The constant-speed traveling event is an event of causing the host vehicle M to travel in the same lane at a constant speed. The following traveling event is an event of causing the host vehicle M to follow another vehicle (hereinafter referred to as a preceding vehicle X) which is present within a predetermined distance (within, for example, 100 [m]) in front of the host vehicle M and is closest to the host vehicle M. The "following" may be, for example, a traveling mode of maintaining a constant inter-vehicle distance (relative distance) between the host vehicle M and the preceding vehicle X, or may be a traveling mode of causing the host vehicle M to travel in the center of a host lane in addition to maintaining a constant inter-vehicle distance between the host vehicle M and the preceding vehicle X. The lane change event is an event of changing the lane of the host vehicle M from the host lane to the adjacent lane. The divergence event is an event of causing the host vehicle M to diverge to a lane on the destination side at a divergence point of a road. The merging event is an event of causing the host vehicle M to merge into a main line at a merging point. The overtaking event is an event of terminating automated driving and switching to manual driving. The event may include, for example, a passing event, an avoidance event or the like. The passing event is an event of temporarily changing the lane of the host vehicle M to the adjacent lane, passing the preceding vehicle X in the adjacent lane and then changing the lane to the original lane again. The avoidance event is an event of causing the host vehicle M to perform at least one of braking and steering in order to avoid an obstacle which is present in front of the host vehicle M.

The event determiner 142 may change, for example, an event already determined with respect to the current section to another event in accordance with a peripheral situation recognized by the recognizer 130 during traveling of the host vehicle M, or may determine a new event with respect to the current section.

The event determiner 142 may change an event already determined with respect to the current section to another event in accordance with an occupant's operation of a vehicle-mounted instrument, or determine a new event with respect to the current section. For example, in a case where an occupant operates a direction indicator, the event determiner 142 may change the event already determined with respect to the current section to a lane change event, and newly determine a lane change event with respect to the current section.

For example, in a case where an occupant operates the lever of a direction indicator (also referred to as a stoke or a switch) to indicate a left turn, the event determiner 142 determines a lane change event of changing the lane of the host vehicle M to an adjacent lane located on the left side when seen from the host vehicle M. For example, in a case where an occupant operates the lever of a direction indicator to indicate a right turn, the event determiner 142 determines a lane change event of changing the lane of the host vehicle M to an adjacent lane located on the right side when seen from the host vehicle M.

The event determiner 142 may determine an event of determining a traveling mode of driving assistance in a route in which a recommended lane is determined. For example, the event determiner 142 determines a following traveling event of causing the preceding vehicle X recognized by the recognizer 130 to follow the host vehicle M (a mode of performing a so-called ACC), or determines a lane keeping event of controlling the steering of the host vehicle M in accordance with the position of a partition line recognized by the recognizer 130 (an aspect of performing a so-called LKAS).

The target trajectory generator 144 generates a future target trajectory along which the host vehicle M is caused to travel automatically (irrespective of a driver's operation) in a traveling mode specified by an event so that the host vehicle M travels in a recommended lane determined by the recommended lane determiner 61 in principle and copes with its peripheral situation when the host vehicle M travels in the recommended lane. The target trajectory includes, for example, at least one of a position element for determining a future position of the host vehicle M and a speed element for determining a future speed or the like of the host vehicle M.

For example, the target trajectory generator 144 determines a plurality of points (trajectory points) at which the host vehicle M will arrive in order as position elements of a target trajectory. The trajectory points are points at which the host vehicle M will arrive after predetermined traveling distances (for example, approximately every several [m]). The predetermined traveling distances may be calculated by, for example, a distance along a road when advancing along a route.

The target trajectory generator 144 determines a target speed and a target acceleration for each predetermined sampling time (for example, approximately several tenths of a [sec]) as speed elements of a target trajectory. The trajectory points may be positions at which the host vehicle M will arrive at sampling times for respective predetermined sampling times. In this case, the target speed or the target acceleration is determined by intervals between sampling times and trajectory points. The target trajectory generator 144 outputs information indicating the generated target trajectory to the second controller 160.

The second controller 160 controls the traveling driving force output device 200, the brake device 210, and the steering device 220 so that the host vehicle M passes along the target trajectory generated by the target trajectory generator 144 according to scheduled times.

The second controller 160 includes, for example, a first acquirer 162, a speed controller 164, and a steering controller 166.

The first acquirer 162 acquires information of a target trajectory (trajectory point) from the target trajectory generator 144, and stores the acquired information in the memory of the storage 190.

The speed controller 164 controls one or both of the traveling driving force output device 200 and the brake device 210 on the basis of a speed element (such as, for example, a target speed or a target acceleration) included in a target trajectory stored in the memory.

The steering controller 166 controls the steering device 220 in accordance with a position element included in the target trajectory stored in the memory (such as, for example, a curvature indicating the degree of bend of the target trajectory).

The processes of the speed controller 164 and the steering controller 166 are realized by, for example, a combination of feedforward control and feedback control. As an example, the steering controller 166 executes a combination of feedforward control according to the curvature of a road in front of the host vehicle M and feedback control based on deviation from the target trajectory.

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and a power electronic control unit (ECU) that controls these components. The power ECU controls the above components in accordance with information which is input from the second controller 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which is input from the second controller 160 or the information which is input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. The brake device 210 is not limited to the above-described configuration, and may be an electronic control type hydraulic brake device that controls an actuator in accordance with the information which is input from the second controller 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second controller 160 or the information which is input from the driving operator 80, and changes the direction of the turning wheel.

The third controller 170 includes, for example, a second acquirer 172 and a HMI controller 174. The HMI controller 174 is an example of a "display controller."

The second acquirer 172 acquires information of a result recognized by the recognizer 130, and acquires information of a target trajectory generated by the target trajectory generator 144.

The HMI controller 174 controls the HMI 30 on the basis of the information acquired by the second acquirer 172, and causes the HMI 30 to output various types of information. For example, the HMI controller 174 causes the display device 32 of the HMI 30 (particularly, the first display 32A) to display a road on which a host lane, the adjacent lane or the like is recognized by the recognizer 130. Further, the HMI controller 174 may cause the display device 32 to display another vehicle recognized by the recognizer 130 or a target trajectory generated by the behavior plan generator 140.

Process Flow

Figure 4:
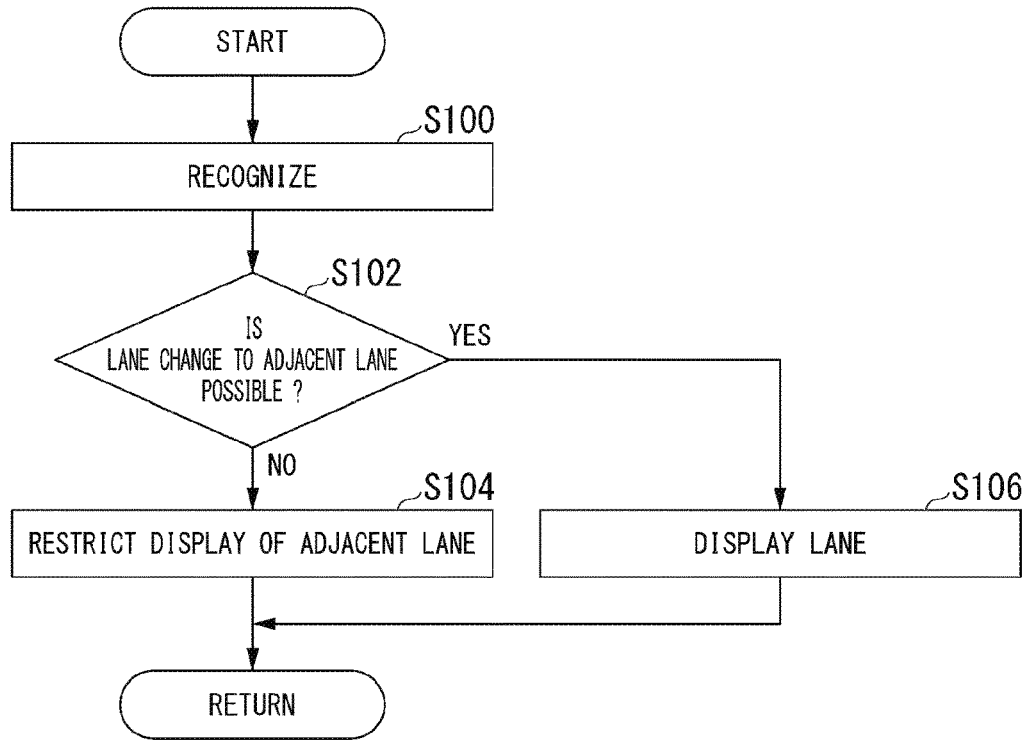
FIG. 4 is a flow chart showing an example of a flow of a series of processes performed by an automated driving control device according to the embodiment.

Hereinafter, a flow of a series of processes performed by the automated driving control device 100 according to the embodiment will be described with reference to a flow chart. FIG. 4 is a flow chart showing an example of a flow of a series of processes performed by the automated driving control device 100 according to the embodiment. The processing of the present flow chart may be repeatedly executed, for example, with a predetermined period.

First, the recognizer 130 recognizes a host lane in which the host vehicle M is present and an adjacent lane adjacent to the host lane by comparing the pattern and color of a partition line recognized from an image of the camera 10 or the like with the pattern and color of a partition line included in the second map information 62 (step S100). In this case, the recognizer 130 may recognize another adjacent lane adjacent to the adjacent lane.

Next, the behavior plan generator 140 determines whether the host vehicle M can perform a lane change from the host lane to the adjacent lane (step S102). For example, the behavior plan generator 140 determines whether a lane change to the adjacent lane can be performed on the basis of the type of partition line for partitioning both lanes between the host lane and the adjacent lane. Specifically, in a case where the color of a partition line located between the host lane and the adjacent lane is a color indicating that a lane change is prohibited (for example, yellow), the behavior plan generator 140 determines that a lane change to the adjacent lane can be performed. In a case where the adjacent lane is a lane deviating from a route to the destination of the host vehicle M, the behavior plan generator 140 determines that a lane change to the adjacent lane cannot be performed. In a case where the host lane and the adjacent lane are adjacent to each other with a channeling zone or a specific regulation sign interposed therebetween, the behavior plan generator 140 determines that a lane change to the adjacent lane cannot be performed. The channeling zone is a road partition line or a road sign for displaying a place necessary to induce safe and smooth traveling of a vehicle. The channeling zone is also referred to as a zebra zone.

The specific regulation sign is a road sign indicating a no entry portion of a vehicle. The channeling zone does not recommend a vehicle to enter, and the specific regulation sign prohibits a vehicle from entering. The channeling zone or the specific regulation sign is an example of a "specific region."

In a case where it is determined by the behavior plan generator 140 that a lane change to the adjacent lane cannot be performed, the HMI controller 174 causes the display device 32 to display the host lane or the like while restricting display of the adjacent lane (step S104). The term "restrict," for example, may refer to not displaying the adjacent lane or all partition lines for partitioning the adjacent lane, may refer to not displaying the adjacent lane or some of the partition lines, may refer to transmissively displaying the adjacent lane and the partition lines with predetermined transmittance, or may refer to displaying the brightness or chromaticity of the adjacent lane and the partition lines to be low.

On the other hand, in a case where it is determined by the behavior plan generator 140 that a lane change to the adjacent lane can be performed, the HMI controller 174 causes the display device 32 to display the adjacent lane, the host lane or the like without restricting display of the adjacent lane (step S106). This concludes the processing of the present flow chart.

Figure 5:
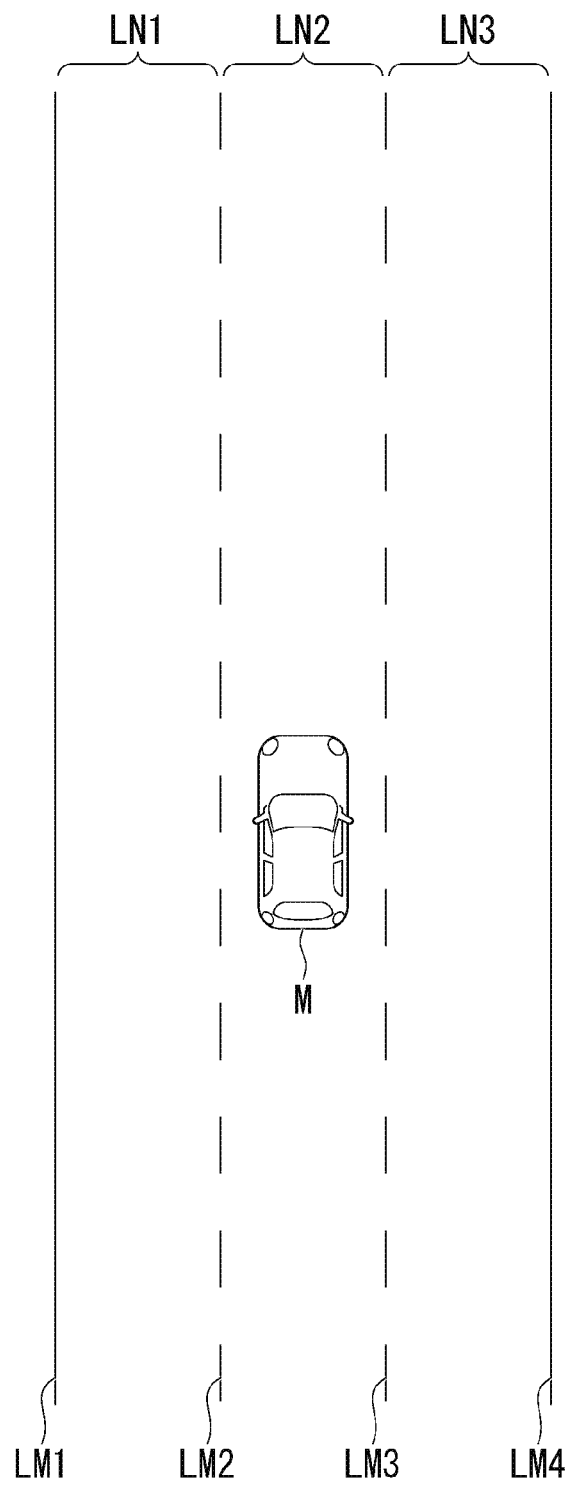
FIG. 5 is a diagram showing an example of a road on which lanes are recognized.

FIG. 5 is a diagram showing an example of a road in which lanes are recognized. In the drawing, LM1 to LM4 represent partition lines, and LN1 to LN3 represent lanes. The recognizer 130 recognizes the lane LN2 partitioned by two partition lines LM2 and LM3 closest to the host vehicle M among the plurality of partition lines as a host lane. The recognizer 130 recognizes the lane LN1 partitioned by both the partition line LM1 and the partition line LM2, located on the left side when seen in the traveling direction of the host vehicle M, out of two partition lines for partitioning the host lane LN2, as a left adjacent lane, and recognizes the lane LN3 partitioned by both the partition line LM4 and the partition line LM3, located on the right side when seen in in the traveling direction of the host vehicle M, as a right adjacent lane.

Figure 6:
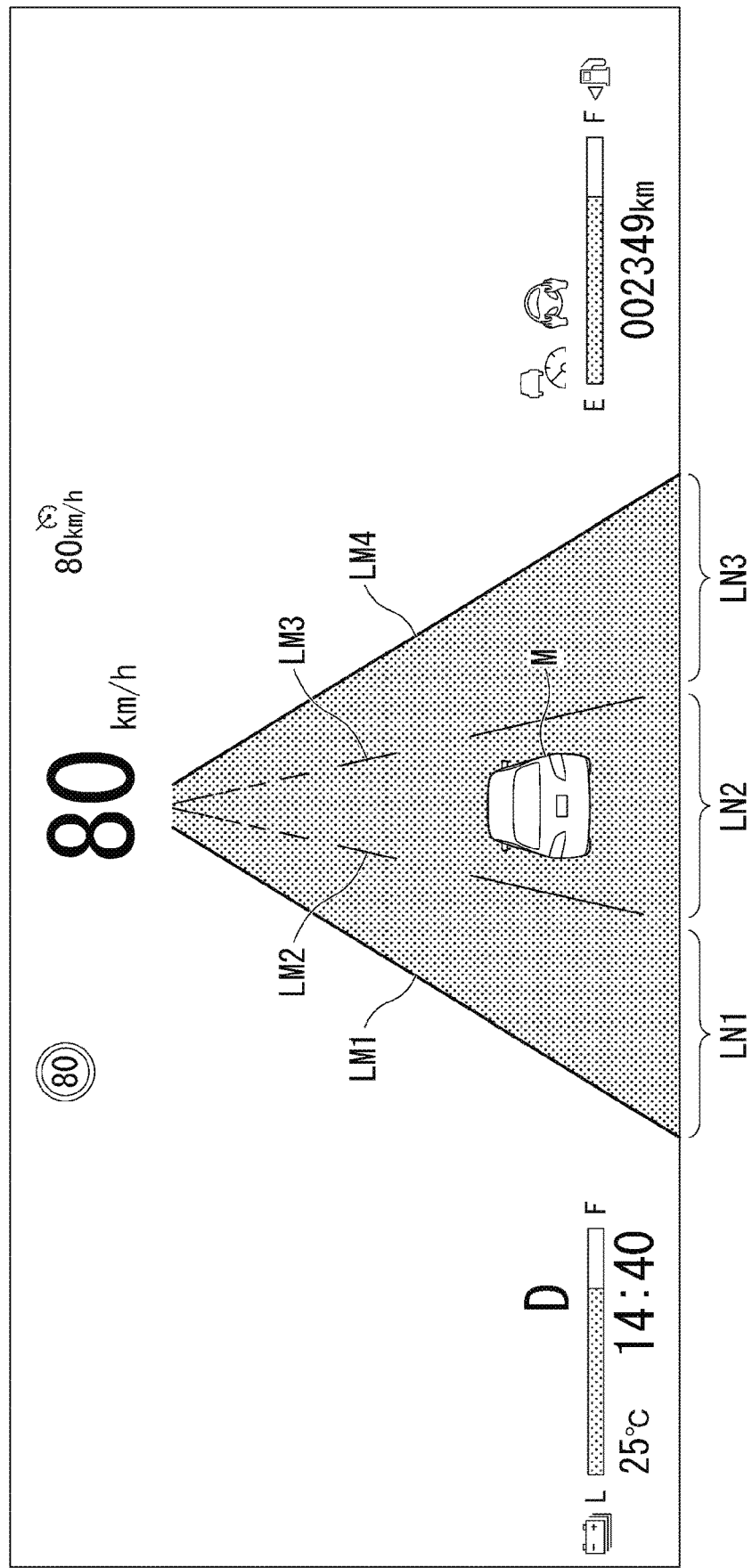
FIG. 6 is a diagram showing an example of a screen of a display device.

FIG. 6 is a diagram showing an example of a screen of the display device 32. In the shown example, the HMI controller 174 causes the display device 32 to display four partition lines and lanes partitioned by these partition lines, as the recognition result of the road shown in FIG. 5.

Figure 7:
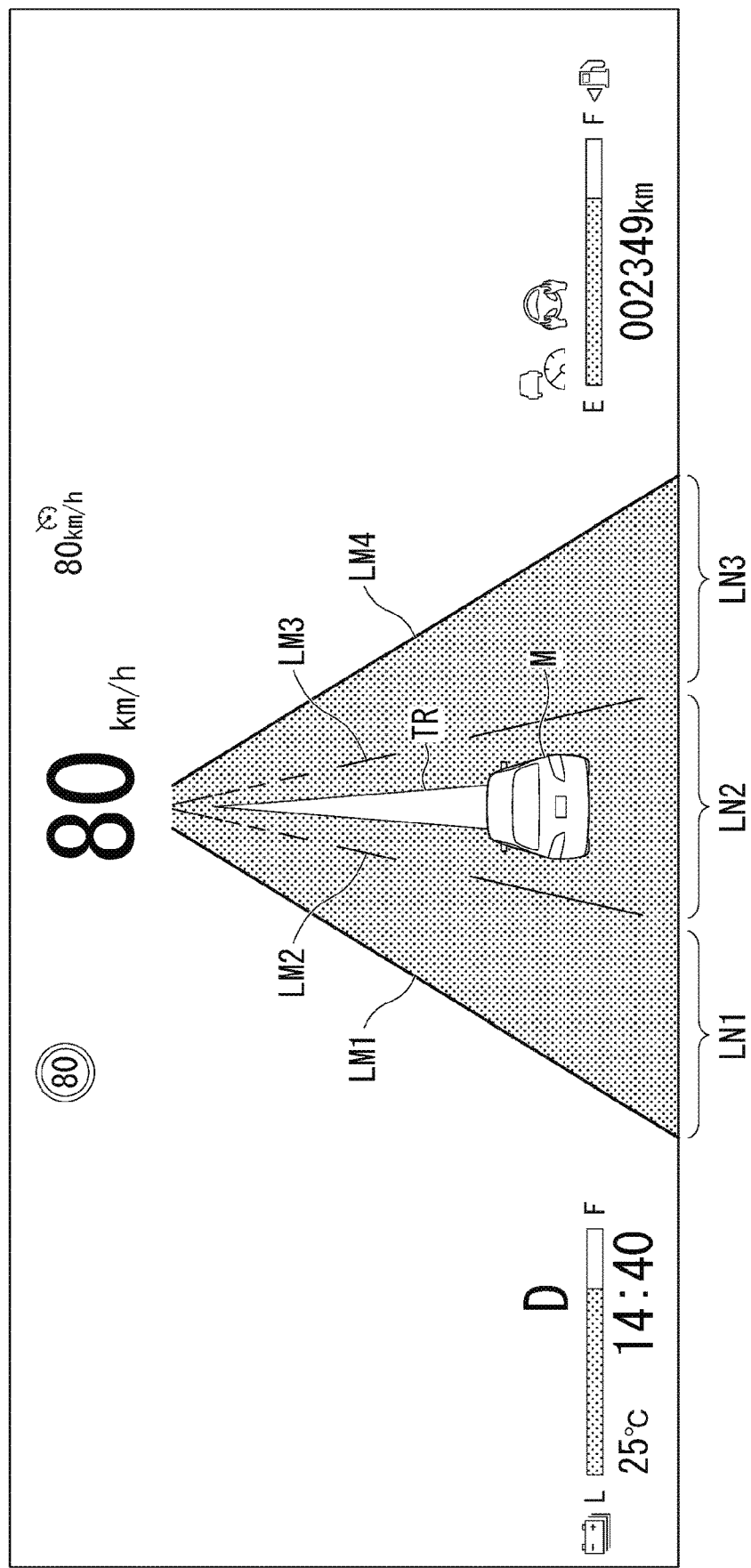
FIG. 7 is a diagram showing another example of the screen of the display device.

FIG. 7 is a diagram showing another example of the screen of the display device 32. In the drawing, TR represents a target trajectory. In the shown example, the HMI controller 174 causes the display device 32 to further display a target trajectory TR superimposed in addition to the partition lines described in FIG. 6.

Figure 8:
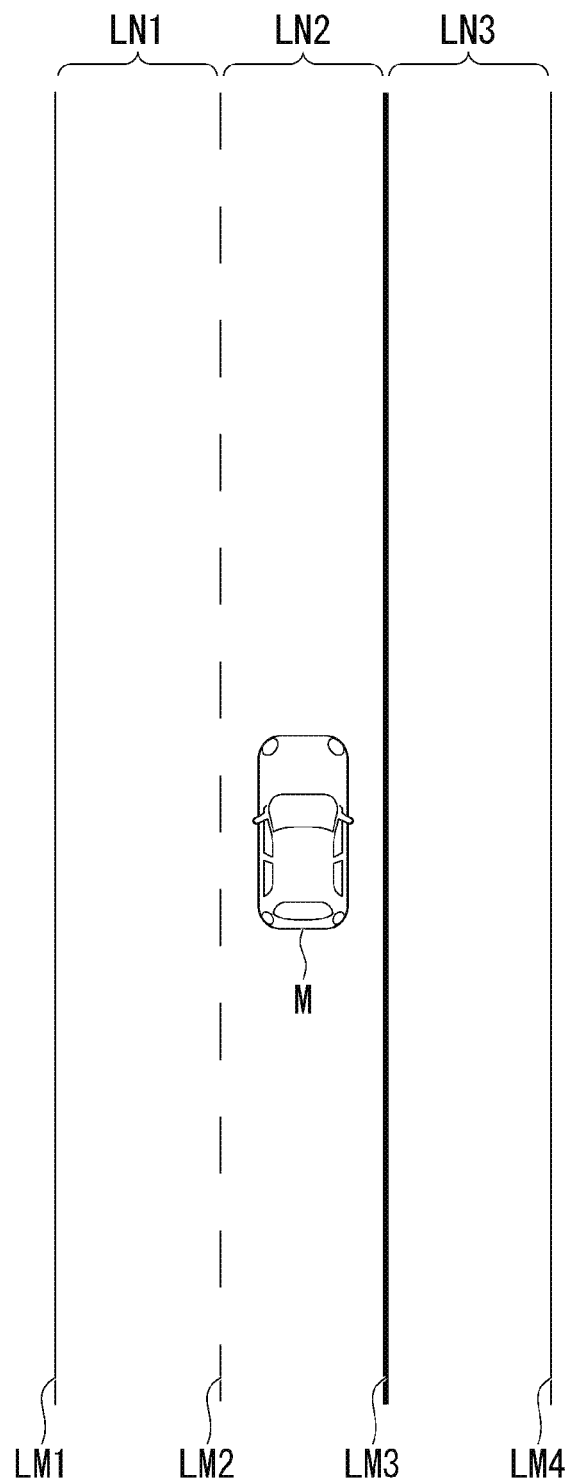
FIG. 8 is a diagram showing another example of the road on which lanes are recognized.

FIG. 8 is a diagram showing another example of the road in which lanes are recognized. In the shown example, the partition line LM3 out of four partition lines is colored with a color indicating that a lane change is prohibited. In such a case, the behavior plan generator 140 determines that a lane change from the host lane LN2 to the adjacent lane LN3 cannot be performed. Receiving this, the HMI controller 174 restricts display of the adjacent lane LN3.

Figure 9:
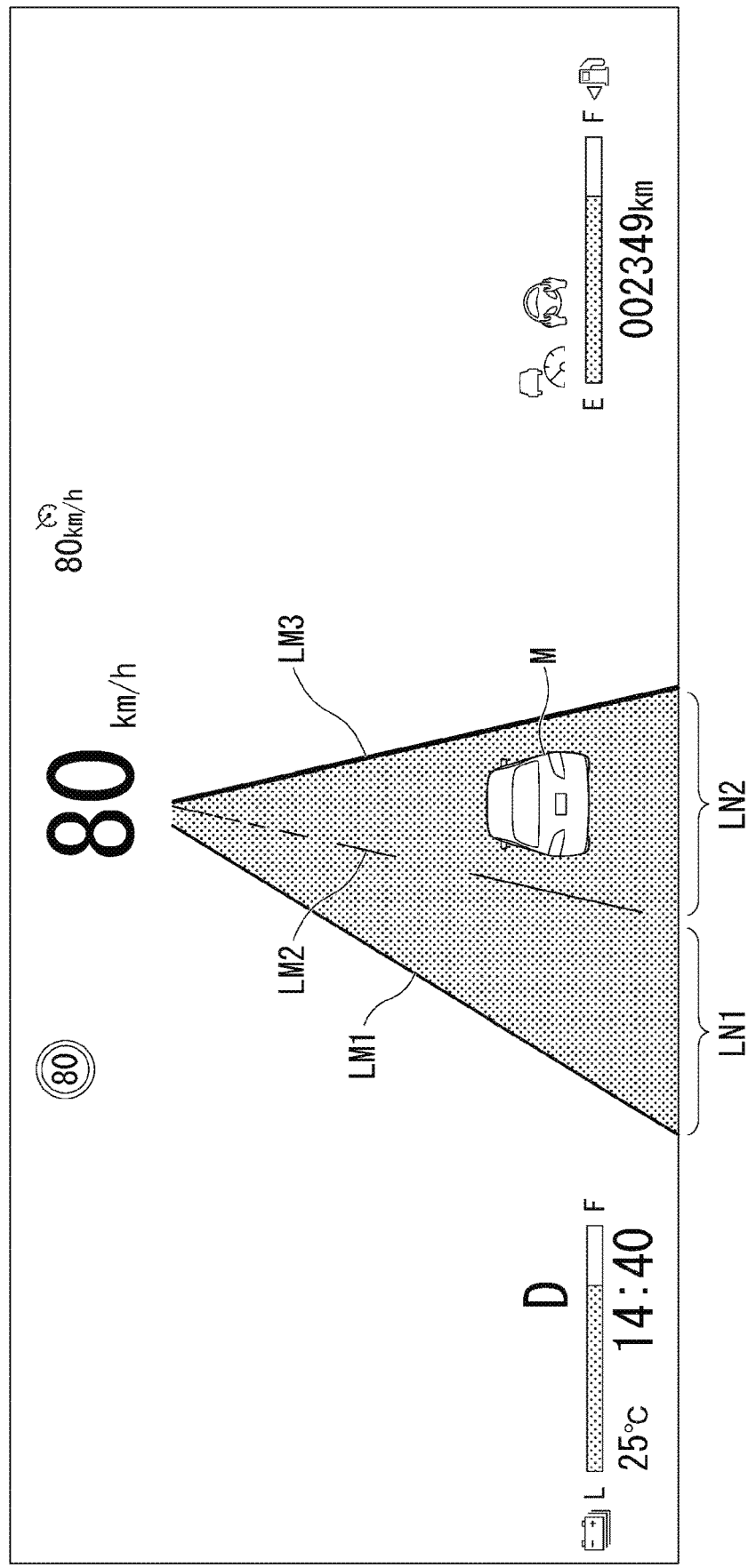
FIG. 9 is a diagram showing another example of the screen of the display device.

FIG. 9 is a diagram showing another example of the screen of the display device 32. In the shown example, the partition line LM4 out of two partition lines for partitioning the adjacent lane LN3 is not displayed, and the adjacent lane LN3 is not displayed.

Figure 10:
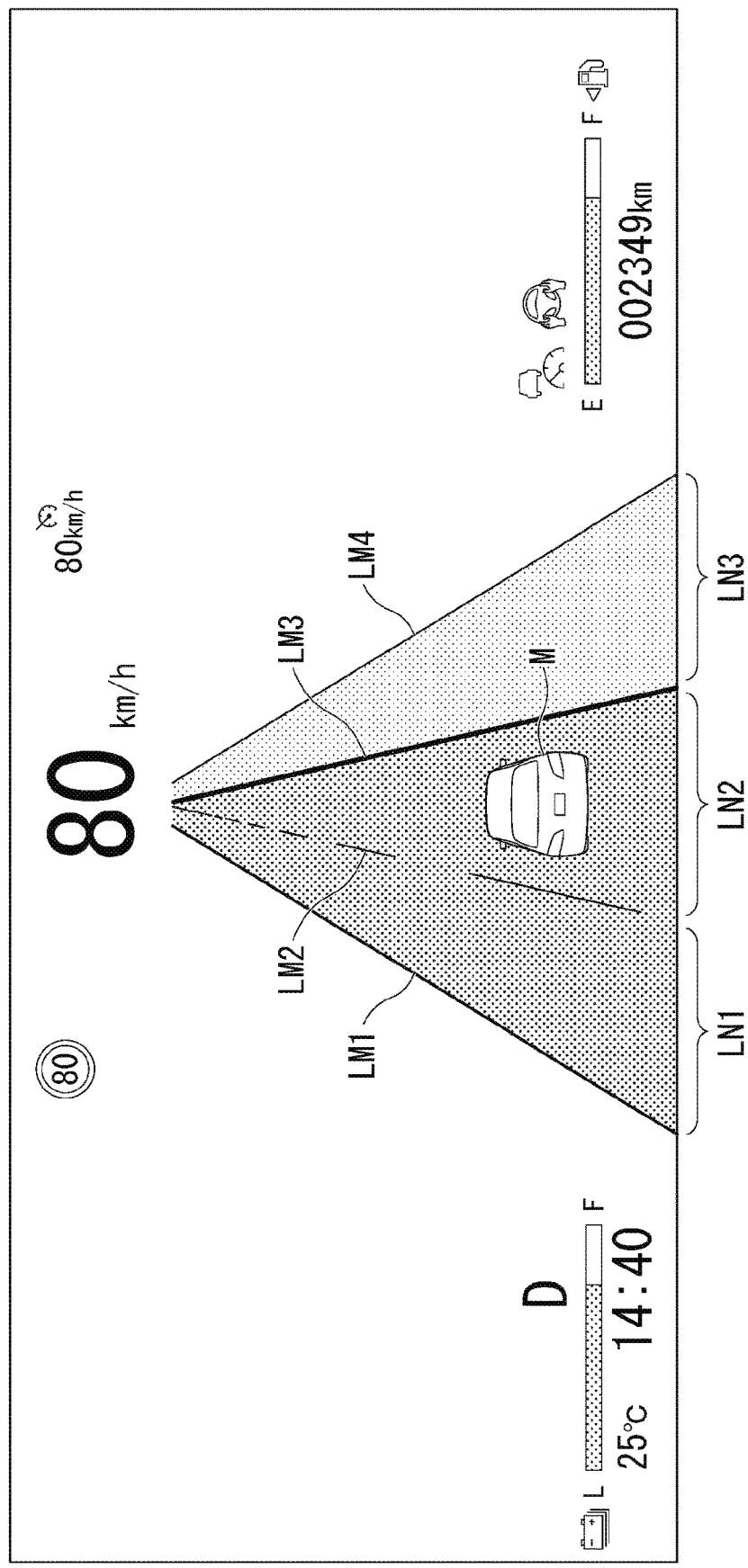
FIG. 10 is a diagram showing another example of the screen of the display device.

FIG. 10 is a diagram showing another example of the screen of the display device 32. In the shown example, the adjacent lane LN3 and the partition line LM4 out of two partition lines for partitioning the adjacent lane LN3 are displayed in a semi-transparent state. As in these screen examples, a lane change to the adjacent lane LN3 can be performed physically, whereas in a situation in which the automated driving control device 100 does not controllably change the lane of the host vehicle M to the adjacent lane LN3, it is possible to allow an occupant to understand that a lane change to the adjacent lane LN3 cannot be performed by restricting display of the adjacent lane LN3.

Figure 11:
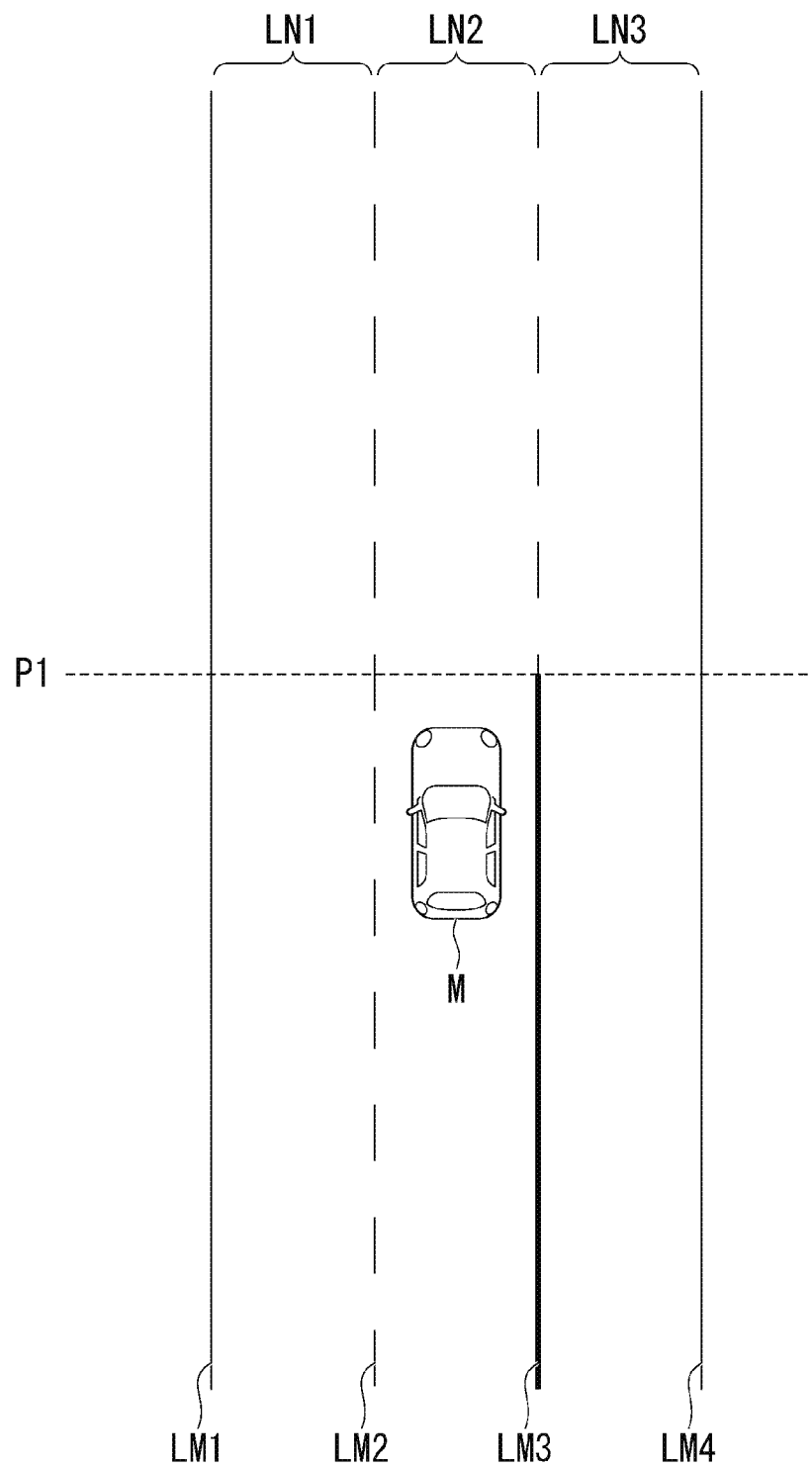
FIG. 11 is a diagram showing another example of the road on which lanes are recognized.

FIG. 11 is a diagram showing another example of the road on which lanes are recognized. In the shown example, in a section located further inward than a certain point P1, the partition line LM3 is a solid line colored with a color indicating that a lane change is prohibited, whereas in a section after the point P1, the partition line LM3 is switched to a broken line colored with a color indicating permission of a lane change (for example, white). In such a case, the HMI controller 174 causes the display device 32 to display the adjacent lane LN3 without restriction in the section after the point P1.

Figure 12:
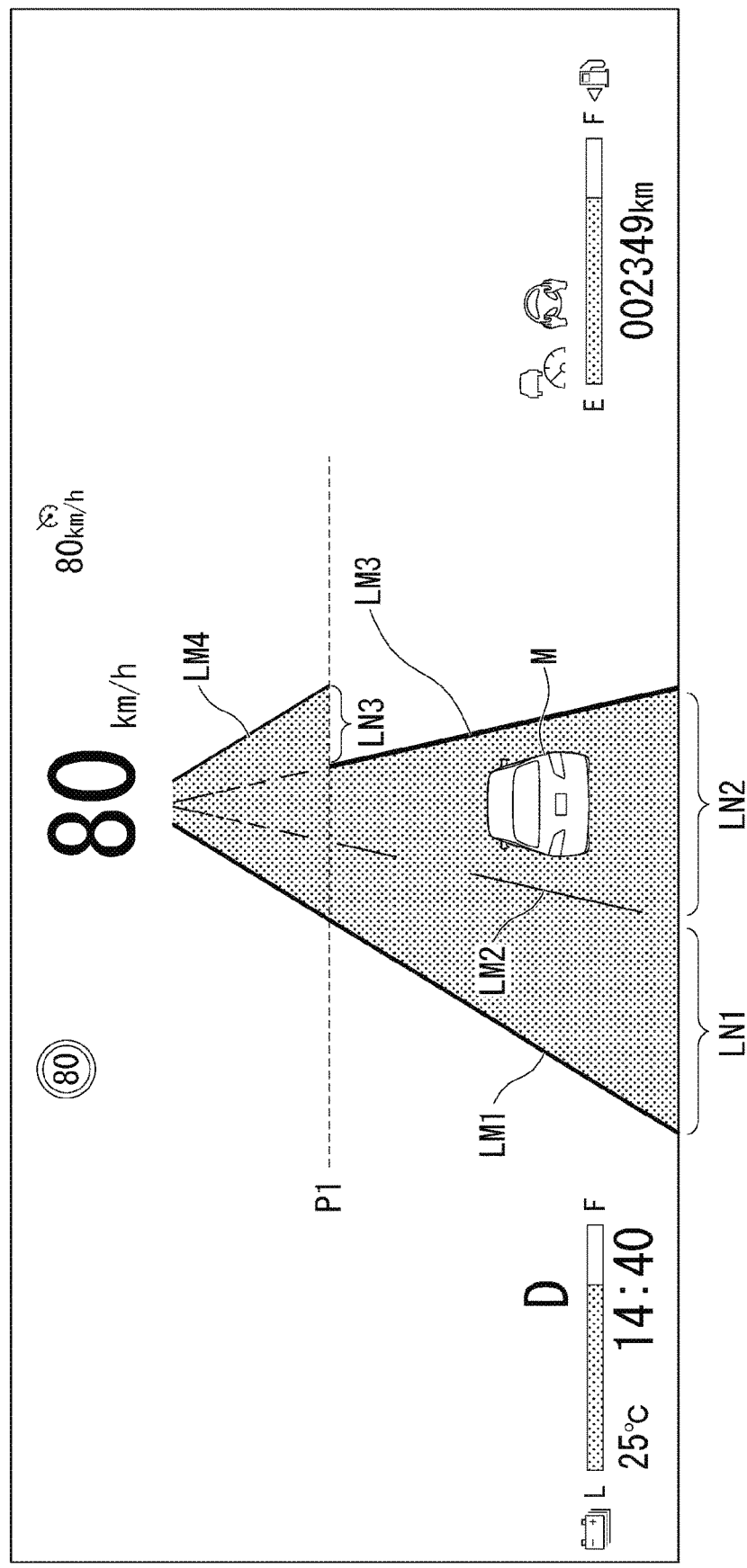
FIG. 12 is a diagram showing another example of the screen of the display device.

FIG. 12 is a diagram showing another example of the screen of the display device 32. In a case where the type of partition line is switched at the point P1, for example, as in the shown example, the HMI controller 174 does not display the partition line LM4 and the adjacent lane LN3 in the section located further inward than the point P1, and displays the partition line LM4 and the adjacent lane LN3 in the section after the point P1.

Figure 13:
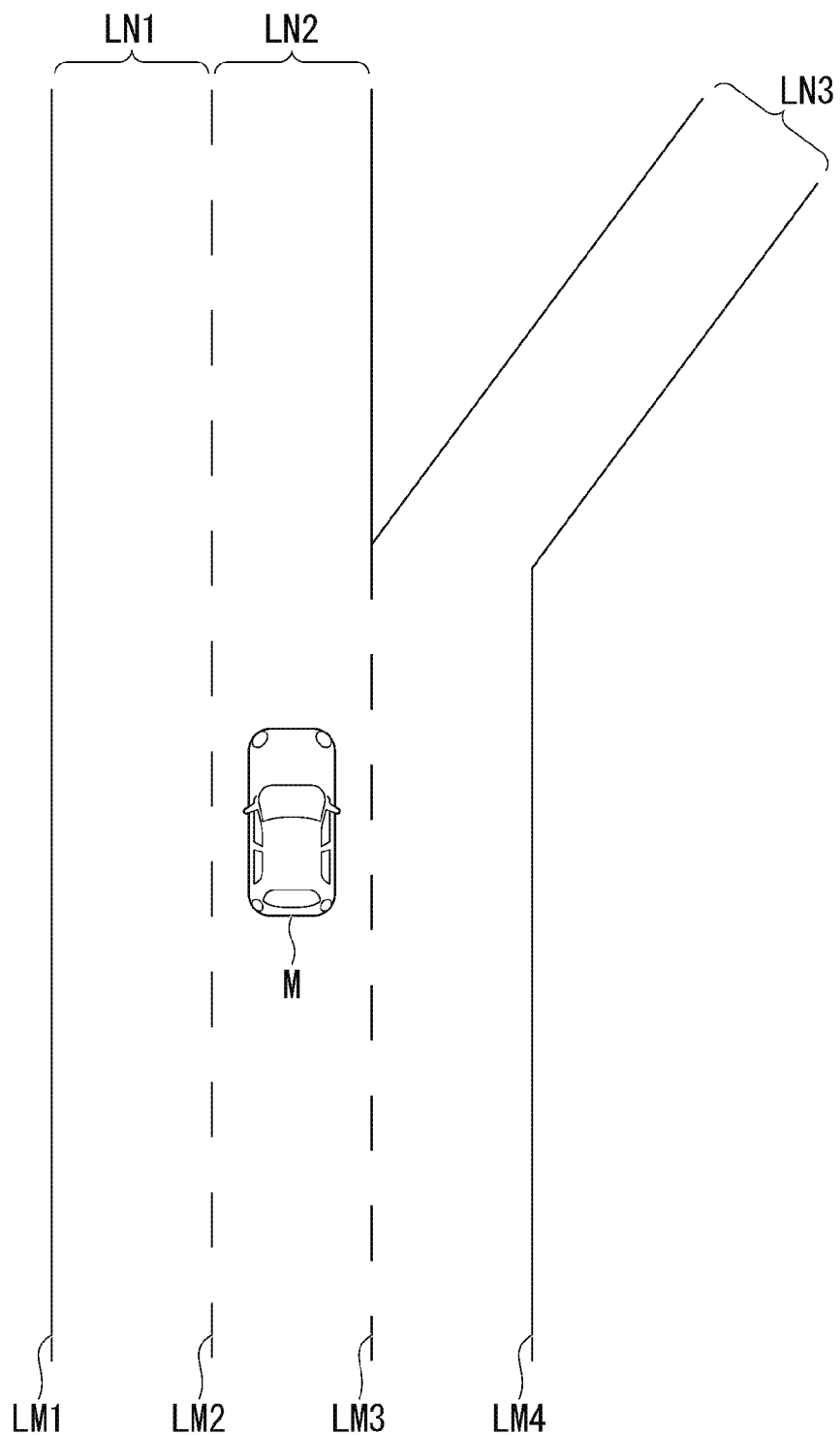
FIG. 13 is a diagram showing another example of the road on which lanes are recognized.

FIG. 13 is a diagram showing another example of the road on which lanes are recognized. In the shown example, the lanes LN1 and LN2 represent lanes included in a route to the destination of the host vehicle M, and the lane LN3 represents a lane deviating from a route to the destination of the host vehicle M. In such a case, the behavior plan generator 140 determines that a lane change from the host lane LN2 to the adjacent lane LN3 cannot be performed. Receiving this, the HMI controller 174 restricts display of the adjacent lane LN3.

Figure 14:
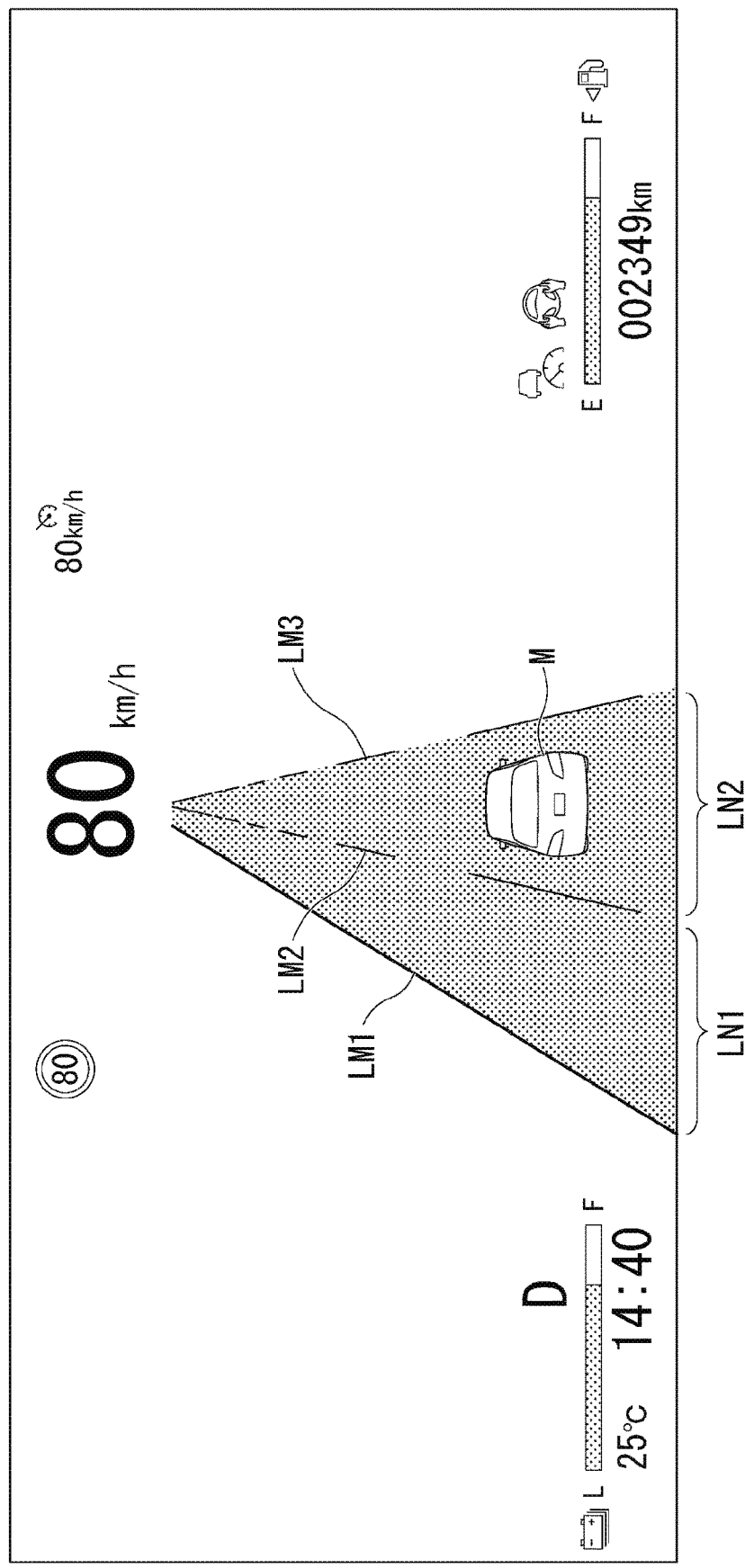
FIG. 14 is a diagram showing another example of the screen of the display device.

FIG. 14 is a diagram showing another example of the screen of the display device 32. In the situation shown in FIG. 13, the adjacent lane LN3 represents a divergence lane from which a route to a destination is deviated. In this case, for example, as in the shown example, the HMI controller 174 does not display the partition line LM4 and the adjacent lane LN3, to thereby restrict display of the adjacent lane LN3.

Figure 15:
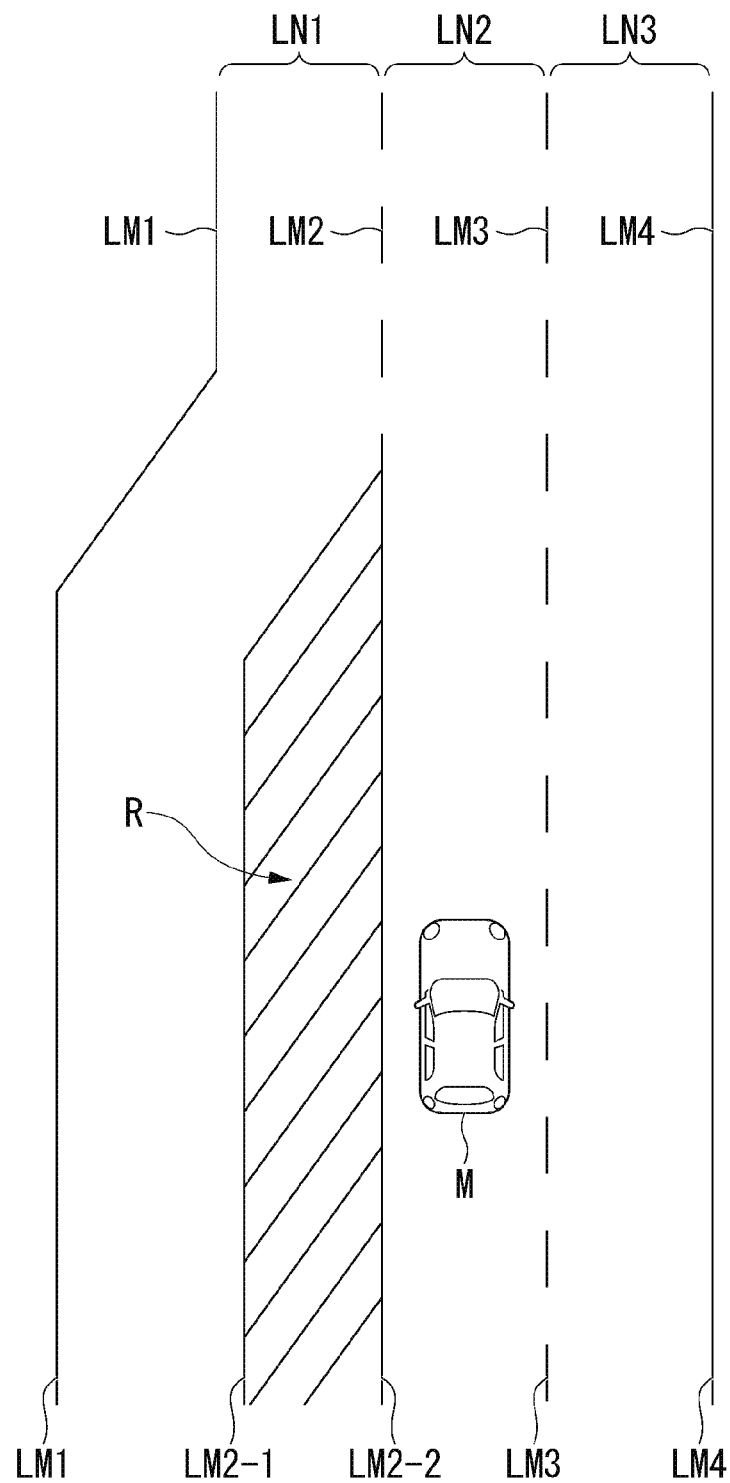
FIG. 15 is a diagram showing another example of the road on which lanes are recognized.

FIG. 15 is a diagram showing another example of the road in which lanes are recognized. In the drawing, R represents a channeling zone. In the shown example, the channeling zone R is present between the host lane LN2 and the adjacent lane LN1. In such a case, the behavior plan generator 140 determines that a lane change from the host lane LN2 to the adjacent lane LN1 cannot be performed. Receiving this, the HMI controller 174 restricts display of the adjacent lane LN1.

Figure 16:
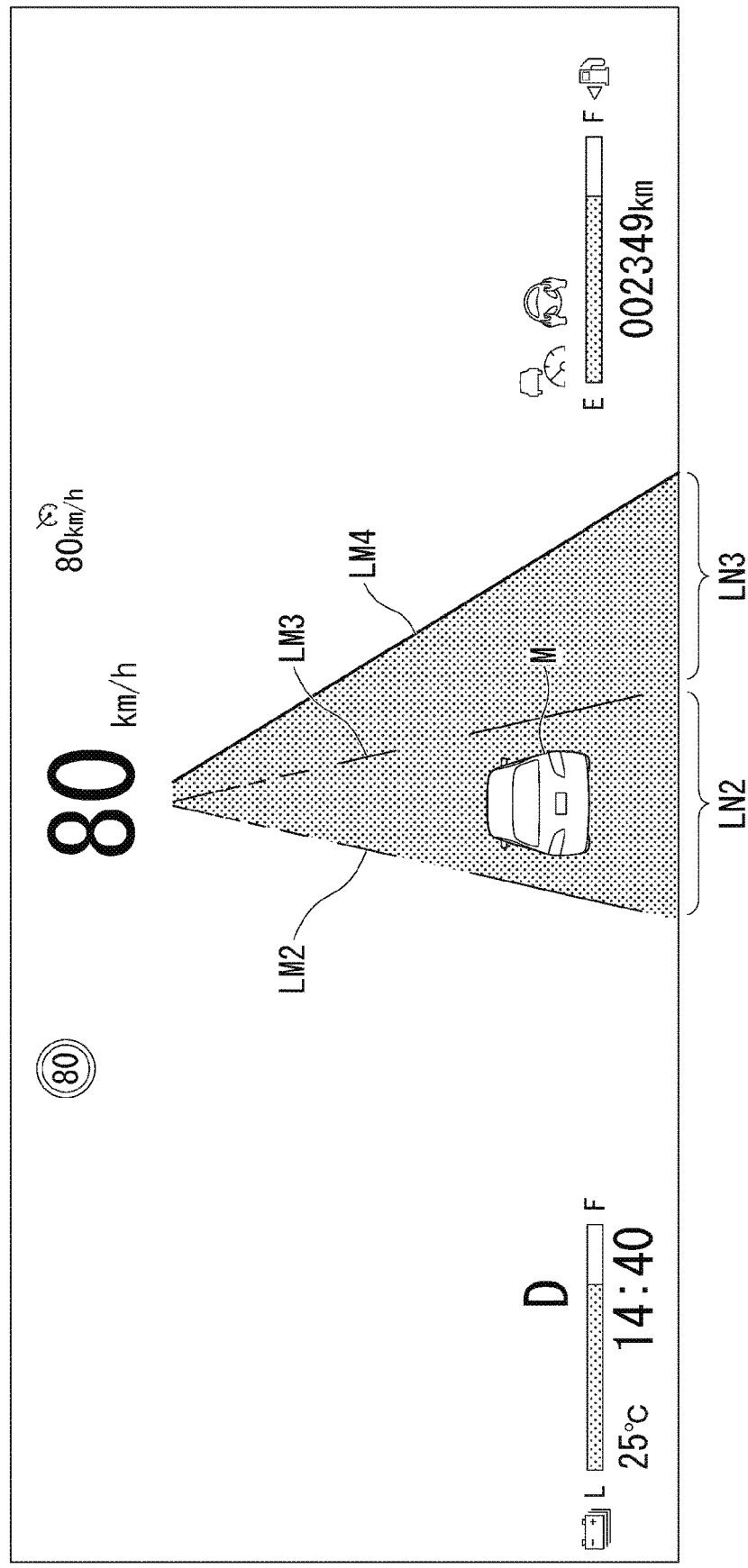
FIG. 16 is a diagram showing another example of the screen of the display device.

FIG. 16 is a diagram showing another example of the screen of the display device 32. In the situation shown in FIG. 15, the channeling zone R in which passing is not recommended is present between the host lane LN2 and the adjacent lane LN1. Therefore, for example, as in the shown example, the HMI controller 174 does not display the adjacent lane LN1 which is present on a side toward the channeling zone R when seen from the host vehicle M, to thereby restrict display of the adjacent lane LN1.

According to the embodiment described above, the display device 32 is caused to display a plurality of partition lines for partitioning a host lane in which the host vehicle M is present and an adjacent lane adjacent to the host lane, the display device 32 is caused to display the adjacent lane and a partition line thereof in a case where the adjacent lane is a lane in which a lane change from the host lane is possible, and causing the display device 32 to display the adjacent lane and the partition line is restricted in a case where the adjacent lane is not a lane in which a lane change from the host lane is possible, whereby it is possible to allow an occupant to correctly understand whether or not to change a lane to an adjacent lane.

Hardware Configuration

Figure 17:
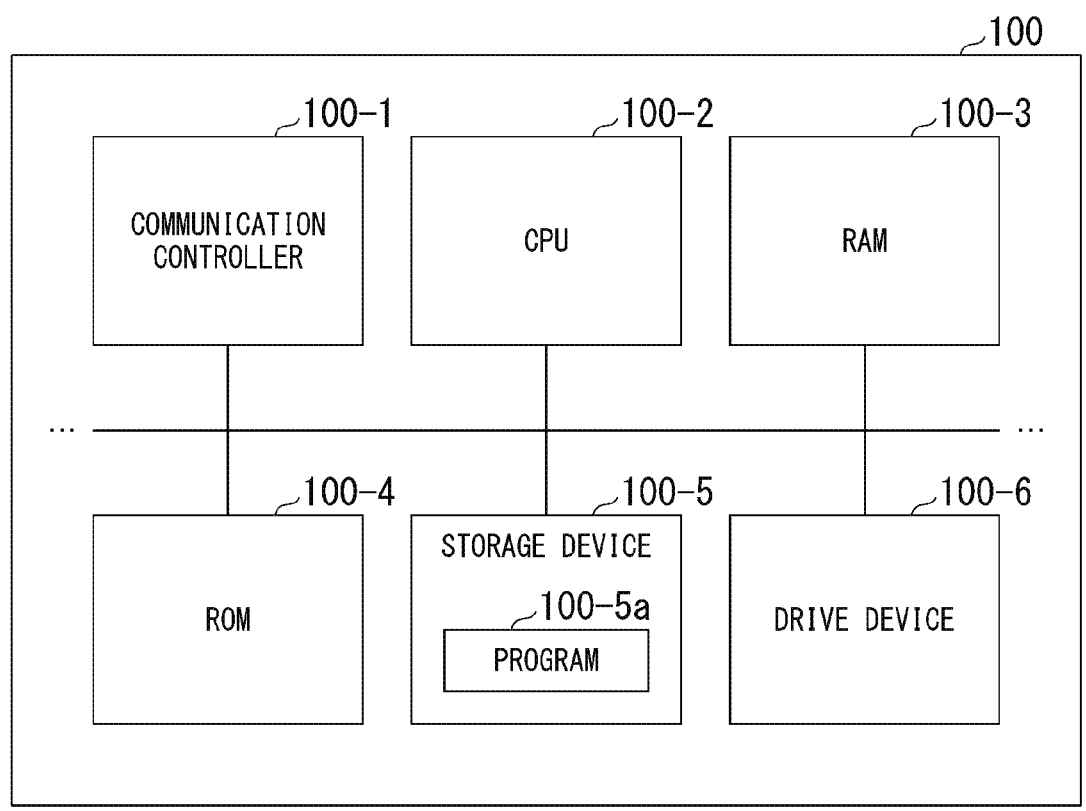
FIG. 17 is a diagram showing an example of a hardware configuration of an automated driving control device according to the embodiment.

FIG. 17 is a diagram showing an example of a hardware configuration of the automated driving control device 100 of the embodiment. As shown in the drawing, the automated driving control device 100 is configured such that a communication controller 100-1, a CPU 100-2, a RAM 100-3 used as a working memory, a ROM 100-4 that stores a boot program or the like, a storage device 100-5 such as a flash memory or an HDD, a drive device 100-6, and the like are connected to each other through an internal bus or a dedicated communication line. The communication controller 100-1 performs communication with components other than the automated driving control device 100. The storage device 100-5 stores a program 100-5a executed by the CPU 100-2. This program is developed into the RAM 100-3 by a direct memory access (DMA) controller (not shown) or the like, and is executed by the CPU 100-2. Thereby, some or all of the first controller 120, the second controller 160, and the third controller 170 are realized.

The above-described embodiment can be represented as follows.

A display control device including:
a display that is an information;
a storage device that stores a program; and
a processor,
wherein the processor is configured to execute the program, to thereby cause the display to display a plurality of partition lines for partitioning a first lane in which a vehicle is present and a second lane adjacent to the first lane,
cause the display to display a partition line of the second lane in a case where the second lane is a lane in which a lane change from the first lane is possible, and
restrict causing the display to display the partition line of the second lane in a case where the second lane is not a lane in which a lane change from the first lane is possible.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display control device comprising:
a display that is configured to display information;
a display controller that is configured to cause the display to display a plurality of partition lines for partitioning a host lane in which a vehicle is present and an adjacent lane adjacent to the host lane; and
a determiner that is configured to determine whether the adjacent lane is a lane in which a lane change from the host lane is possible,
wherein the display controller is configured to cause the display to display a partition line of the adjacent lane in a case where it is determined by the determiner that the adjacent lane is a lane in which a lane change from the host lane is possible, and
is configured to restrict causing the display to display the partition line of the adjacent lane in a case where it is determined by the determiner that the adjacent lane is not a lane in which a lane change from the host lane is possible.

2. The display control device according to claim 1, wherein the determiner is configured to determine whether a color of the partition line of the adjacent lane is a first color indicating prohibition of the lane change, and
wherein the determiner is configured to determine the adjacent lane is not a lane in which a lane change from the host lane is possible in a case where the color of the partition line of the adjacent lane is the first color.

3. The display control device according to claim 2, wherein the determiner is configured to determine whether the color of the partition line of the adjacent lane is changed from the first color to a second color indicating permission of the lane change, and
wherein the determiner is configured to determine the adjacent lane is a lane in which a lane change from the host lane is possible in a case where the color of the partition line of the adjacent lane is changed from the first color to the second color.

4. The display control device according to claim 1, wherein the determiner is configured to determine whether the adjacent lane is a lane deviating from a route to a destination of the vehicle, and
wherein the determiner is configured to determine the adjacent lane is not a lane in which a lane change from the host lane is possible in a case where the adjacent lane is a lane deviating from the route.

5. The display control device according to claim 1,
wherein the determiner is configured to determine whether the host lane and the adjacent lane are adjacent to each other with a specific region in which passing is not recommended or is prohibited interposed therebetween, and
wherein the determiner is configured to determine the adjacent lane is not a lane in which a lane change from the host lane is possible in a case where the host lane and the adjacent lane are adjacent to each other with the specific region.

6. The display control device according to claim 1, wherein the display controller is further configured to restrict causing the display to display the adjacent lane and the partition line for partitioning the adjacent lane in a case where it is determined by the determiner that the adjacent lane is not a lane in which a lane change from the host lane is possible.

7. The display control device according to claim 1, wherein the determiner is configured to determine whether the adjacent lane is a lane in which a lane change from the host lane is possible on the basis of a type of the partition line for partitioning both lanes between the host lane and the adjacent lane.

8. A display control method comprising causing a computer mounted in a vehicle including a display that is configured to display information to:
cause the display to display a plurality of partition lines for partitioning a host lane in which the vehicle is present and an adjacent lane adjacent to the host lane;
determine whether the adjacent lane is a lane in which a lane change from the host lane is possible;
cause the display to display a partition line of the adjacent lane in a case where the adjacent lane is a lane in which a lane change from the host lane is possible; and
restrict causing the display to display the partition line of the adjacent lane in a case where the adjacent lane is not a lane in which a lane change from the host lane is possible.

9. A computer readable non-transitory storage medium having a program stored therein, the program causing a computer mounted in a vehicle including a display that is configured to display information to execute:
causing the display to display a plurality of partition lines for partitioning a host lane in which the vehicle is present and an adjacent lane adjacent to the host lane;
determining whether the adjacent lane is a lane in which a lane change from the host lane is possible;
causing the display to display a partition line of the adjacent lane in a case where the adjacent lane is a lane in which a lane change from the host lane is possible; and
restricting causing the display to display the partition line of the adjacent lane in a case where the adjacent lane is not a lane in which a lane change from the host lane is possible.

* * * * *